S. M. HOCKMAN.
Broadcast-Seeder.
No. 11,609.
Patented Aug. 29, 1854.
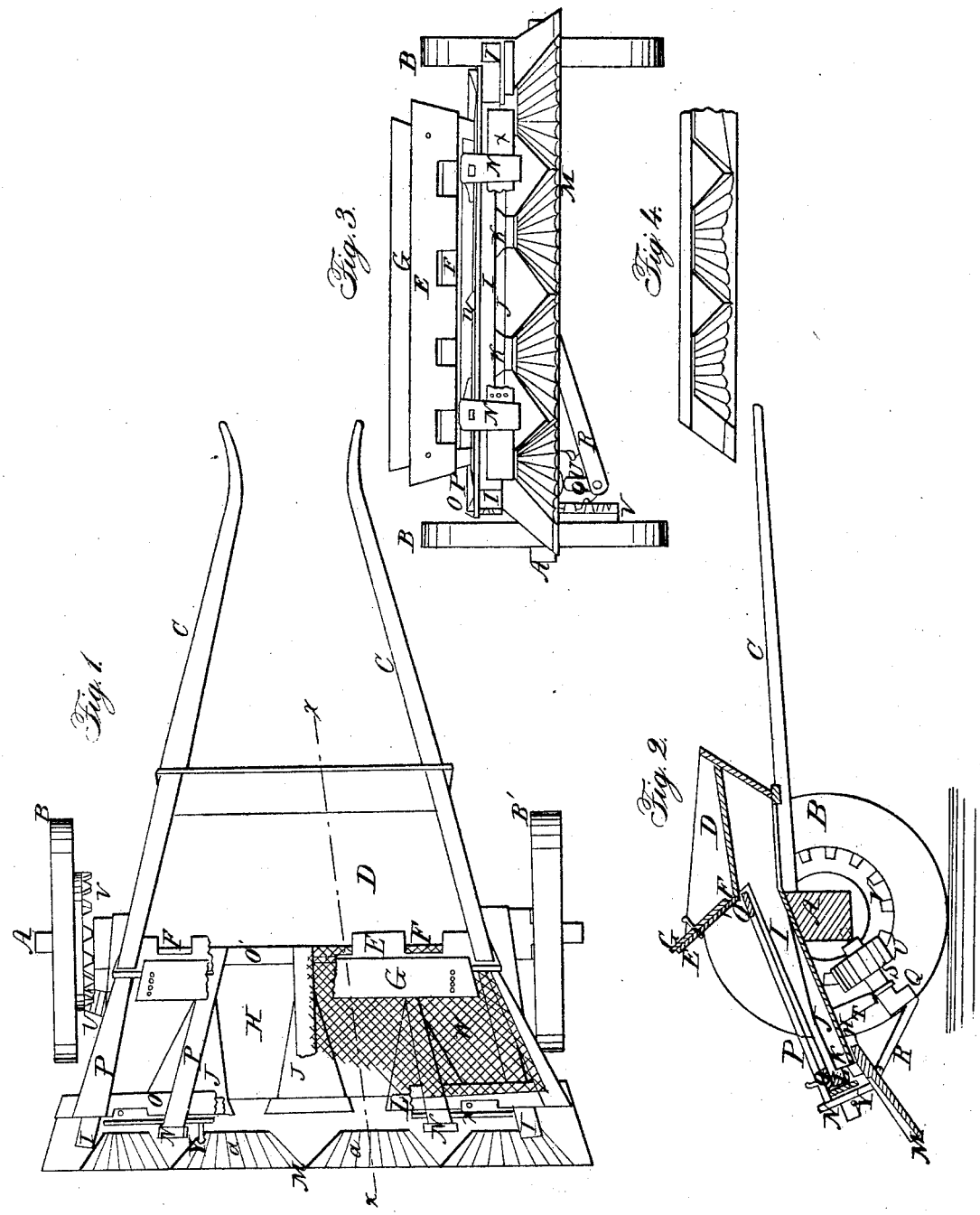

UNITED STATES PATENT OFFICE.

SAMUEL M. HOCKMAN, OF TOM'S BROOK, VIRGINIA.

IMPROVEMENT IN SEED-PLANTERS.

Specification forming part of Letters Patent No. 11,609, dated August 29, 1854.

*To all whom it may concern:*

Be it known that I, SAMUEL M. HOCKMAN, of Tom's Brook, in the county of Shenandoah and State of Virginia, have invented certain new and useful Improvements in Machines for Planting or Sowing Grain, Seed, Manure, &c.; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is a plan of the machine, in which some parts are broken away to show others more clearly. Fig. 2 is a sectional elevation of Fig. 1 through the line $z\ z$. Fig. 3 is an elevation of the rear of the machine.

In these drawings, A is the axle; B B', wheels fitted to turn freely on the axle A; C C, shafts to which the animal may be harnessed in some convenient manner, so as to draw the machine. Just forward and partially over the axle A, I make a box, D, in the form represented, to rest upon the axle and shafts, to which it is fastened. The rear E of this box is provided with a series of holes, F F, and also with a sliding board, G, which may be set higher or lower, so as to graduate the quantity of seed or manure which escapes from the box D to be sown or spread upon the land. A board, H, is fastened to the axle A, and extends back from the axle, and is supported at each end by portions I I of the ends of the box D, which are fastened to it for that purpose. I fasten some angular cleats, J J, to the board H, so that the seed or manure which passes through the holes F will fall each side of the cleats J J, and be conducted by them to the openings K, each side of the cleats J and under the bar L, fastened to the rear ends of the cleats and the ends I of the box D.

I make a traversing frame consisting of the board M, standards N N, and frame O, which frame O is formed of the bars O O' and cross-bars P P, fastened together. The bar O rests and traverses on the bar L, when it is operated by the crank Q, which is connected to the board M by the connecting-rod R, as represented. The crank-shaft S is fitted to turn in a staple in the bracket T, fastened to the under side of the board H, and in a hole in the axle A, and has the pinion U fastened to it, which is acted upon by the gear V, fastened to the wheel B, as represented. The screen W is fastened to the frame O, and is traversed with it to screen the seed or manure after it passes through the holes F F, and retains any straw, sticks, or other refuse matter, which would choke the openings K and prevent the seed or manure from escaping regularly and uniformly as the machine is drawn over the ground.

The quantity of seed or manure distributed is graduated after it is screened by the board X, which may be adjusted as desired, and fastened by the pins Y Y, which pass through it into the bar L.

Directly opposite the openings K K, I cut some angular spaces in the board M, and cut radial scores $a\ a$ in the bottom of each of these spaces, so that as the manure descends the board M it will pass down the scores and be distributed uniformly by them over the entire surface of the ground. It is preferable to make the angular spaces in the board M convex or highest in the middle, as represented in Fig. 4.

The machine having been constructed and completed as above described, the grain or manure to be distributed is put in the box D, and the board G set so as to graduate the quantity that passes through the holes F onto the screen W, which separates all the straw, sticks, and other refuse matter, and it passes down over the screen and drops off of the rear of the machine, while the grain or pulverized manure passes through the screen onto the board H, and it is conducted by the cleats J to the openings K, through which it passes onto the board M into the angular spaces and descends the scores $a\ a$ and drops upon the ground. As the screen W separates the refuse matter from the grain or manure and prevents it from choking the openings K, these openings may be graduated by the board X with the greatest precision, so as to distribute a small quantity of materials over a comparatively large surface. The screen W should be made to sag between the cross-bars P P, so that the manure which falls from the holes F F will be screened and fall into the spaces between the cleats J J, and pass out through the openings K K, as heretofore described. As the machine is drawn along, a traverse motion is communicated to the screen and board M, as described.

The advantages of the above-described construction and arrangement may be enumerated as follows, viz: By making several short holes F F of considerable perpendicular depth, they will discharge a limited amount of manure with far less liability of choking than if the same area were used in one long narrow opening, and the same may be said of the openings K K. By the construction and arrangement of the holes F F and the bars P P, which make ridges across the screen, the cleats J J, openings K K, and radial scores *a a*, this machine will distribute the grain or manure uniformly broadcast nearly as well upon hillsides and inclined land as upon level ground, as the bars P P, cleats J J, and scores *a a* prevent the manure from running to the lowest side of the machine, and this is a very important advantage which this machine possesses over all other machines for sowing broadcast.

Since the introduction and application of guano as a fertilizer the farmers have suffered great inconvenience for want of some means of sowing and distributing it quickly and cheaply. For I have proved by ample experience that taking a pack of guano upon my back and sowing it by hand, saturating my clothes, making my hands very sore, and injuring my health, is the most unpleasant, disagreeable, and laborious farm-labor that I ever performed, and the difficulty of applying it has prevented its use to a greater or less extent; hence the inducements for making a machine to accomplish so desirable an object; and although I have constructed this machine with special reference to guano, it will be found a most valuable machine for sowing other fertilizers and grain.

What I claim as my invention, and desire to secure by Letters Patent in the above-described machine for sowing grain and manure, is—

1. The inclined traversing or agitated screen W, or its equivalent, to separate the refuse or other matter which is too large to pass through the openings which graduate the quantity spread upon the ground, and thereby prevent such openings from becoming choked.

2. I am aware that radial scores on a plane surface are described and represented in Francis Van Doren's Patent of the 13th of April, 1852. Therefore I do not claim radial scores on a plane surface; but what I do claim is making radial scores on a somewhat convex surface, so as to distribute the grain and manure more uniformly, substantially as described and represented.

In testimony whereof I have hereunto signed my name before two subscribing witnesses.

SAMUEL M. HOCKMAN.

Witnesses:
SAML. GRUBB,
J. DENNIS, Jr.